(12) United States Patent
Galassi

(10) Patent No.: US 6,656,244 B1
(45) Date of Patent: Dec. 2, 2003

(54) FAT REMOVING LABYRINTH FILTER FOR ASPIRATING HOODS

(75) Inventor: Alvaro Galassi, Perugia (IT)

(73) Assignee: Faber S.p.A., Fabriano - Ancona (IT)

( * ) Notice: Subject to any disclaimer, the term of this patent is extended or adjusted under 35 U.S.C. 154(b) by 0 days.

(21) Appl. No.: 10/070,476

(22) PCT Filed: Sep. 13, 2000

(86) PCT No.: PCT/EP00/08979

§ 371 (c)(1),
(2), (4) Date: Mar. 7, 2002

(87) PCT Pub. No.: WO01/23070

PCT Pub. Date: Apr. 5, 2001

(30) Foreign Application Priority Data

Sep. 28, 1999 (IT) ........................ MI990590 U

(51) Int. Cl.[7] .............................................. B01D 45/08
(52) U.S. Cl. ...................... 55/444; 55/446; 55/DIG. 36
(58) Field of Search .................... 55/444, 446, DIG. 36

(56) References Cited

U.S. PATENT DOCUMENTS

| | | | | |
|---|---|---|---|---|
| 1,400,860 A | * | 12/1921 | Brown | 55/432 |
| 3,834,135 A | * | 9/1974 | Jordan | 55/444 |
| 3,870,494 A | * | 3/1975 | Doane | 55/443 |
| 4,690,701 A | | 9/1987 | Hedrick et al. | |
| 4,944,782 A | | 7/1990 | Rajendran et al. | |
| 5,342,422 A | | 8/1994 | Wimböck | |

FOREIGN PATENT DOCUMENTS

| | | |
|---|---|---|
| DE | 299 21 370 | 2/2000 |
| GB | 2 270 638 | 3/1994 |

* cited by examiner

*Primary Examiner*—Robert A. Hopkins
(74) *Attorney, Agent, or Firm*—Hedman & Costigan, P.C.

(57) ABSTRACT

A fat-removing labyrinth filter for aspirating hoods, comprising an upper shell (11) and a lower shell (12) reciprocally fitting into each other and presenting a multiple number of transversal slots (13, 14). The shells (11, 12) enclose a separating element (15) fitted with a multiple number of transversal openings (16) and a multiple number of contact points with the shells (11, 12), where the transversal openings (16) are offset with respect to the transversal slots (13, 14) so as to create at least four paths deviating the flow of air inside the space encompassed by the two shells (11, 12).

6 Claims, 3 Drawing Sheets

FAT REMOVING LABYRINTH FILTER FOR ASPIRATING HOODS

Figure 1:
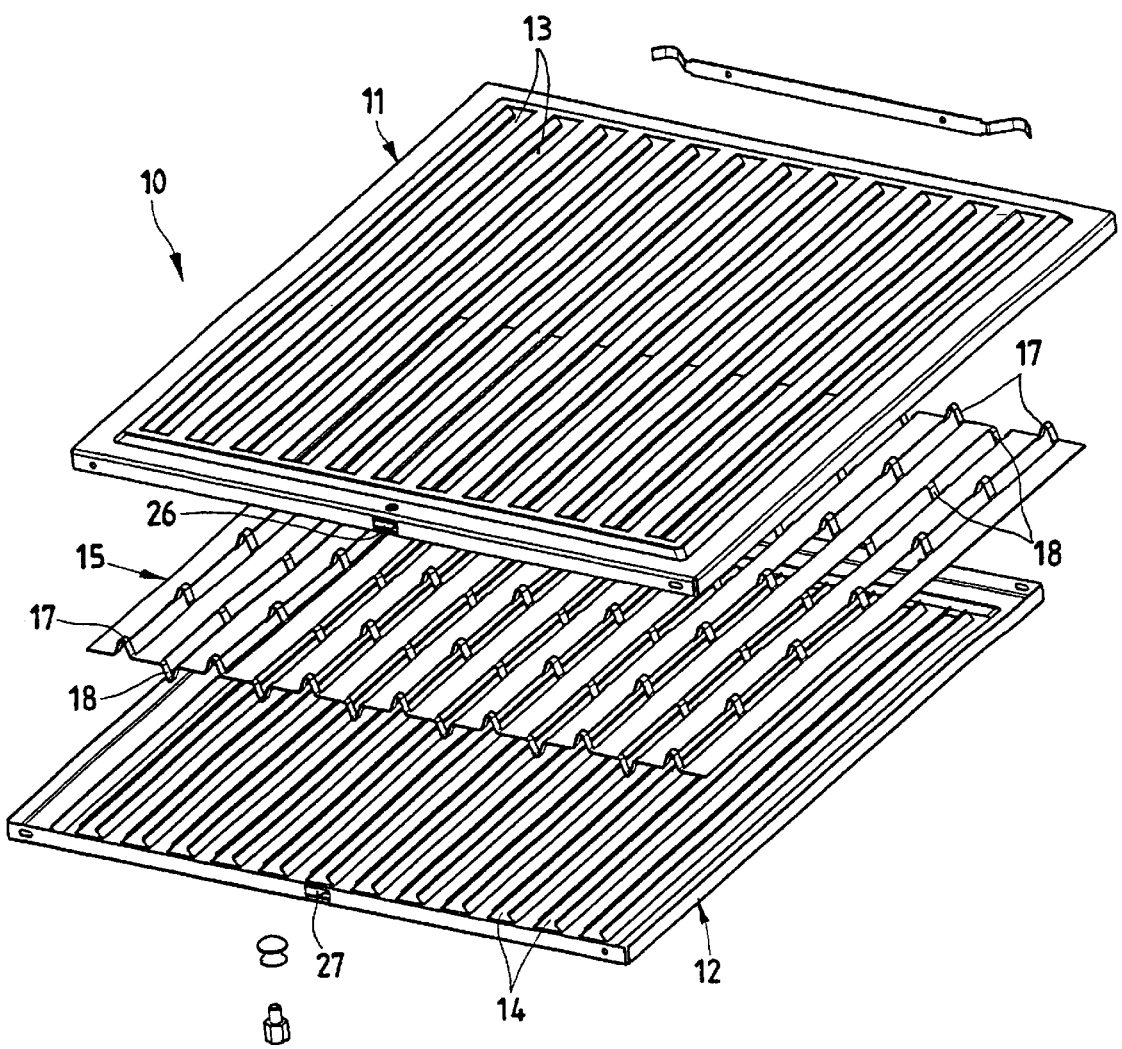

This invention refers to a fat-removing labyrinth filter for aspirating hoods.

The filtration of fatty particles in suspension in the air flow of a ventilator placed inside a kitchen aspirating hood is of particular relevance for the following reasons.

In the first place, because the filtration keeps the inside of the hood cleaner, thus preventing the deposition of fat which may under certain circumstances constitute a fire risk, and in the second place because it significantly minimizes the need for periodical maintenance and cleaning operations.

The filtration of such fatty particles extends the lifetime of the internal component parts of the hood, such as the motor, the wiring, the switches, the lamp holders, the lamps and the rubber or plastic elements, by preventing the strong corrosive and decomposing attack of the fatty acids.

It also allows an optimum use of odor preventing hoods based on activated charcoal and of internally re-circulating hoods, by preventing their rapid saturation caused by fatty particles penetrating the pore spaces of the activated charcoal.

Finally, the filtration of the fatty particles allows keeping clean the ducts discharging air to the outside, and to prevent pollution.

It is therefore understandable that a lot of attention has been dedicated to these problems by the manufacturers of both filters and hoods, and that a variety of solutions have been advanced by them.

The fat-removing hoods known to this date can essentially be classified into the following categories.

In the first place, the filters based on synthetic fiber pads of 10–20 mm thickness, which are low cost but present the following disadvantages: a low to medium head loss, a low to medium efficiency of not over 50%, an high risk of fire due to an excess of retained acids in case of little or wrong maintenance, a need to be cleaned by hand in a long and fastidious process, a duration limited to a few months, a need for repurchasing at a not insignificant periodical expense, and a troublesome installing operation.

A second class of known filters is based on synthetic fiber pads of a thickness of 1–2 mm, which are low-cost but have a low to medium head loss, an average efficiency not exceeding 60%, a limited but definite fire risk and a lesser accumulation of fats even in case of limited maintenance.

Finally, they cannot be cleaned and need replacement, with the consequent periodical purchasing expense and corresponding replacement operations. Their lifetime is also limited to a few months.

Other known filters are based on multiple-layer metallic filters made of stretched metal plate, generally of aluminum. These are characterized by high efficiency in the range of 90%, no fire hazard, low to medium head-loss and compact size.

These filters also constitute a highly effective barrier against any external flames or flames originating from the cooking range; they can also be cleaned in dishwashing machines, easily disassembled and reassembled and present a high durability, even if washed frequently.

However, they present a high cost and an outer appearance which is pleasant but related to the finishing of aluminum, generally of an anodized type, which is poorly suitable for combining with stainless steel, copper and brass.

An additional known class is constituted by metallic labyrinth filters, made of alternating metal profiles, in particular made of stainless steel.

The main characteristics of labyrinth filters is in that the air flow charged with fatty particles is suddenly changed in direction more than across a labyrinth made of communicating spaces formed by guiding surfaces, whose geometry may be designed in various ways and with different degrees of deviation. These sudden changes result in a deposition of part of the fatty particles on the guiding surfaces, because of their difficulty of changing direction because of their weight, which is much heavier than air.

Every deviation provokes the deposition of parts of the fatty particles, which may, after a few deviations, reach a loss of efficiency close to 90%. The labyrinth filter must be periodically cleaned, by hand or in a dishwashing machine, by operations of a greater or lesser simplicity depending on their production type, and their lifetime is generally unlimited. For all these models, the rule of a total recovery of their functional and esthetic efficiency after a washing operation applies.

However, in the metallic labyrinth filters normally available on the market the efficiency of fat particle separation is generally achieved by providing a generous sizing and therefore a broadening of the surfaces touched by the flow, rather than a high number of diramations; it follows that these filters are quite heavy and exhibit a considerable thickness in the range from 29 to 35 mm, which makes it impossible to insert them into the products of a simple and compact design in accordance with the growing modern trends.

Such filters constitute a generally high thickness barrier, from 20.35 mm, and are consequently a heavy obstacle in producing compact units.

This considerable thickness is indispensable to provide labyrinthine passages adequately sized to provide filtration efficiency and limited head losses.

Moreover, while offering an esthetic appearance more in line with that of stainless steel, these filters are rather massive and heavy because of their few large ribs, a fact that prevents them from being slim, modern appliances.

The purpose of this invention is therefore to produce a fat-removing labyrinth filter for aspirating hoods having a high efficiency despite being housed in an extremely compact enclosure.

Other purposes of the invention are to produce a fat-removing filter for aspirating hoods so as to be lightweight, readily cleaned even in dishwashing machines, easily disassembled and reassembled, and endowed with an unlimited lifetime without presenting any fire hazard.

A further purpose of the present invention is to produce a filter of a cost essentially lined-up with the cost of multi-layered aluminum filters, and therefore not very expensive.

Further characteristics of the invention are defined in the claims attached to this patent application.

Figure 2:
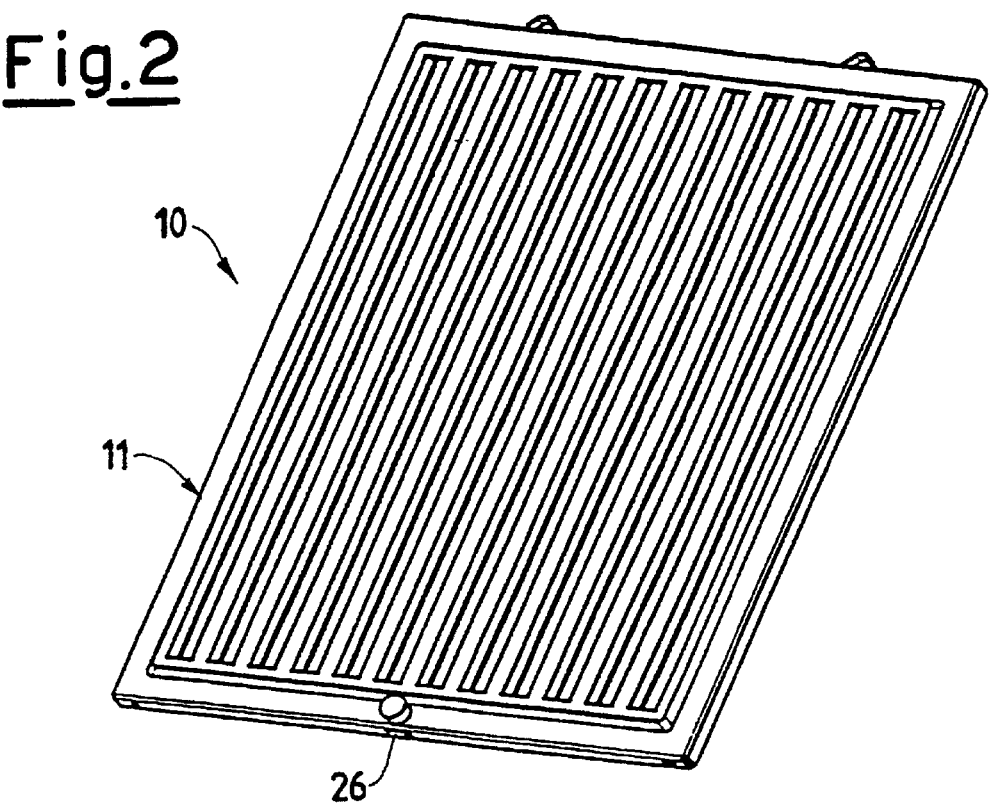
Figure 3:
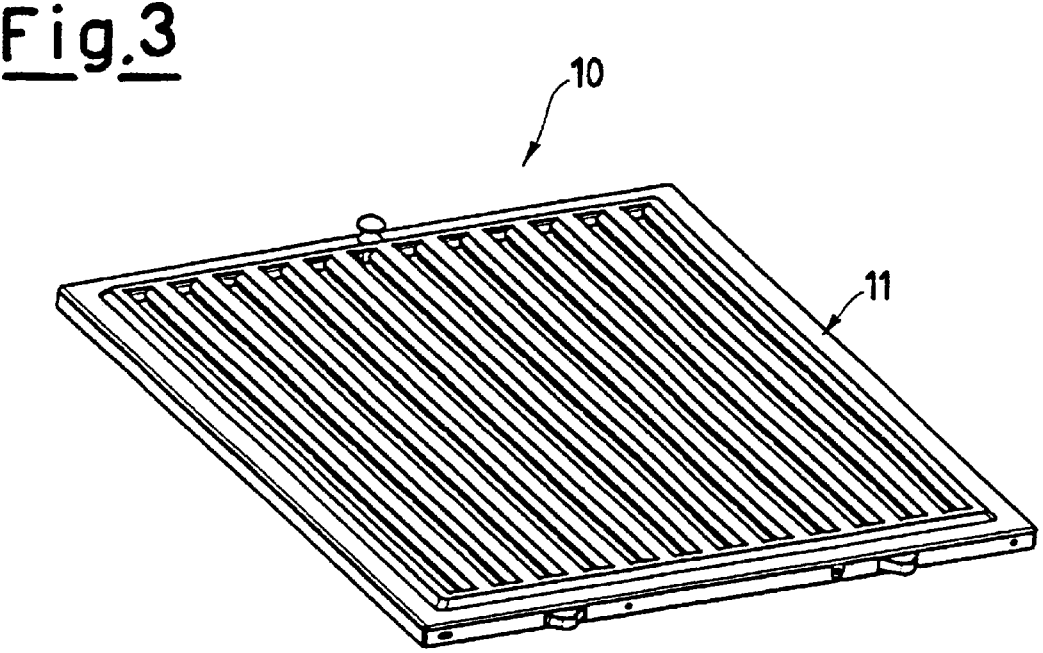
Figure 4:
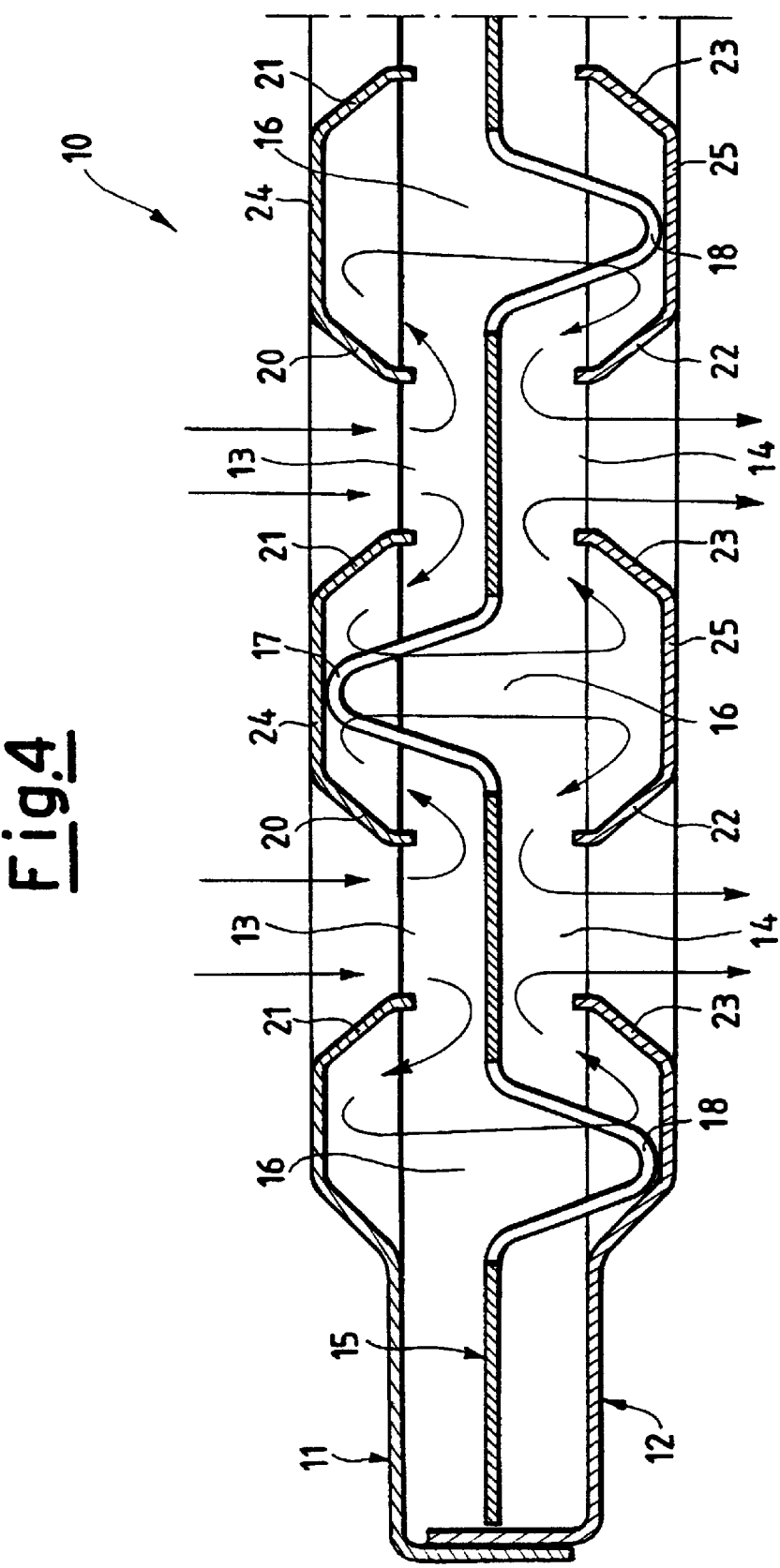

Additional purposes and advantages of this invention will become clear from the description and its attached drawings to follow, supplied for purely exemplifying and non-limiting purposes, in which:

FIG. 1 offers an exploded axonometric view of the fat-removing labyrinth filter according to the present invention, FIGS. 2 and 3 offer axonometric views of the fat-removing filter of FIG. 1, and FIG. 4 is a cross-sectional view of the fat-removing filter of FIG. 1.

With reference to the mentioned figures, the fat-removing filter for aspirating hoods according to this invention is indicated in its overall form by the reference number 10.

The fat-removing filter 10 comprises an upper shell 11 and a lower shell 12 reciprocally fitting into each other and provided with a multiple number of transversal slots 13 and 14.

The shells 11 and 12 enclose between them a central separating unit 15, which presents a multiple number of transversal openings 16 and a multiple number of points of contact with the upper shell 11 and the lower shell 12.

These points of contact are formed by a multiple number of tips 17 and 18, oriented in groups pointing in opposite directions.

As later described in this description in further detail, the transversal openings 16 are offset with respect of those of the transversal slots 13 and 14, so as form at least four deviations for the flow of air inside the space enclosed by the shells 11 and 12.

The transversal slots 13 and 14 belonging to the shells 11 and 12 are separated from each other by some ribs 24 for the upper shell 11, and some ribs 25 for the lower shell 12.

The ribs 24 and 25 in turn present some inclined lateral surfaces, indicated by the reference numbers 20 and 21 for the upper shell 11 and by the reference numbers 22 and 23 for the lower shell, respectively, all of which are turned toward the inside of the fat-removing filter 10.

The fat-removing filter 10 presents a multiple number of snap-type teeth 26 and eyelets 27, present on the peripheral flaps of the shells 11 and 12 and suitable for achieving the reciprocally fitting closing of the shells 11 and 12, by interposing the separating element 15 between them.

The fat-removing filter 10 is made of a metallic material which may be chosen among stainless steel, anodized aluminum, brass or copper.

The operation of the fat-removing filter 10 according to this invention will now be briefly illustrated. With reference to FIG. 4, which shows the cross section of the fat-removing filter 10, it can be seen that the incoming air flow undergoes, after splitting up into two opposite directions, at least four important deviations: a first 180° entrance deviation immediately after impinging against the separator element 15, a second 180° deviation immediately after impinging against the inside of the upper shell 11, a third 180° deviation immediately after impinging against the inside of lower shell 12, and a fourth 180° exit deviation immediately after impinging against the separator unit 15.

Because the deposition and capture of the fatty particles is directly proportional to the number of deviations of the air flow containing them, it follows that the efficiency is high even at a limited thickness of the filter 10.

Moreover, in this invention the separator element 16 serves the purpose of keeping the two upper and lower shells 11 and 13 uniformly distanced from each other, thanks to the contact offered by the tips 17 and 18. The particular sinusoidal profile of the separator element 16, which touches at the points of contact of the tips 17 and 18 on the internal surfaces of the ribs 24 and 25 of the shells 11 and 12, ensures at all points the maintenance of proper cross-sections for the passage of air, and confers some longitudinal strength to the ribs 24 and 25 themselves.

Both the shells 11 and 12 and the separator element 16 can be produced automatically starting from metallic ribbons, with a minimum waste of material.

The assembly can also be made automatic, by grasping the two shells 11 and 12, interposing the separator element 16 and the closing of the two interconnected shells 11 and 12 by the snap-type teeth 26 and eyelets 27 provided on their peripheral flaps.

The above description describes the characteristics as well as the advantages of the fat-removing filter for aspirating hoods as an object of this invention.

For the first time, it has in fact been possible to achieve a fat-removing labyrinth filter of high efficiency, enclosed in an extremely compact structure.

The filter has a limited weight and thickness, can be cleaned in a dishwashing machine, even if operated on a heavy cycle, and can be disassembled and reassembled with great ease.

The filter has an unlimited durability and an esthetic appearance compatible with that of stainless steel, with numerous slim ribs of a refined appearance, and is marked by a high industrial reproducibility.

The fat-removing filter of the invention has the capacity of preventing the passage of the flame.

Moreover, it befits the top criteria of economy, of operating ease and environmental friendliness, because it is indestructible and suitable for recycling, if necessary.

Finally, it is clear that numerous variations may be applied to the fat-removing filter for aspirating hoods as an object of this invention, without thereby abandoning the innovative principle inherent in the inventive idea.

In the practical implementation of the invention, the materials, shapes and dimensions of the details outlined above may be of any kind, depending on the requirements, and the same may be substituted by others of a technically equivalent type.

What is claimed is:

1. A fat-removing labyrinth filter (10) for aspirating hoods, characterized in that said fat-removing labyrinth filter comprises an upper shell (11) and a lower shell (12) capable of being reciprocally fitted into each other, which present a multiple number of transversal slots (13, 14), where the said shells (11, 12) enclose a separating element (15) fitted with a multiple number of transversal openings (16) and a multiple number of points of contact with said shells (11, 12), and where said transversal openings (16) are offset with respect to said transversal slots (13, 14), so as to create at least four deviations of the flow of air inside the space encompassed by the two shells (11, 12).

2. A fat-removing filter according to claim 1, characterized in that said transversal slots (13, 14) belonging to said shells (11, 12) are separated by ribs (24, 25).

3. A fat-removing filter according to claim 2, characterized in that said ribs (24, 25) have inclined lateral walls (20, 21, 22, 23) turned toward the inside of said fat-removing filter.

4. A fat-removing filter according to claim 1, characterized in that said points of contact of the separating element (16) with said shells (11, 12) are constituted by a multiple number of tips (17, 18) oriented in groups pointing in opposite directions.

5. A fat-removing filter according to claim 1, characterized in that said filter provides for a multiple number of snap-type teeth (26) present on the peripheral flaps of said shells (11, 12), capable of allowing the closing of the two reciprocally interlocked shells (11, 12) while holding said interposed separator (16) between said interlocked shells.

6. A fat-removing filter according to claim 1, characterized in that said filter is made of metallic materials.

* * * * *